Oct. 12, 1965   A. C. PETERS   3,211,320
FILLER NECK AND CLOSURE
Filed Oct. 30, 1963
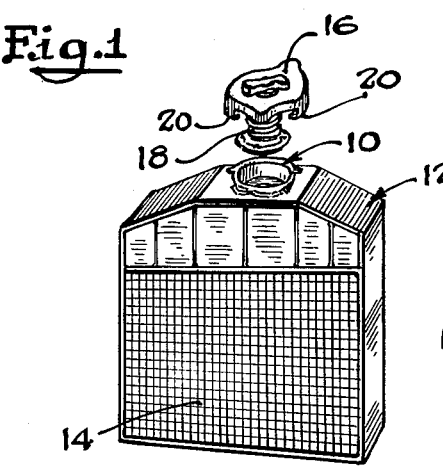
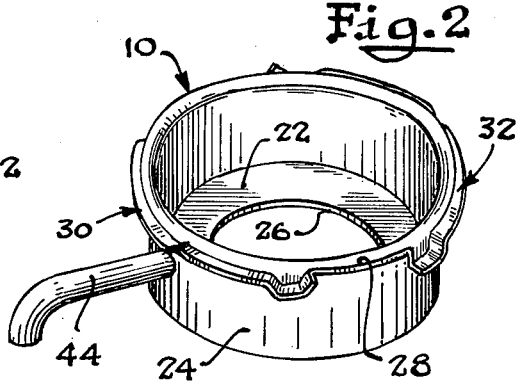
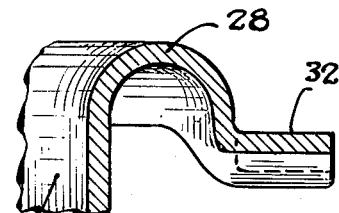
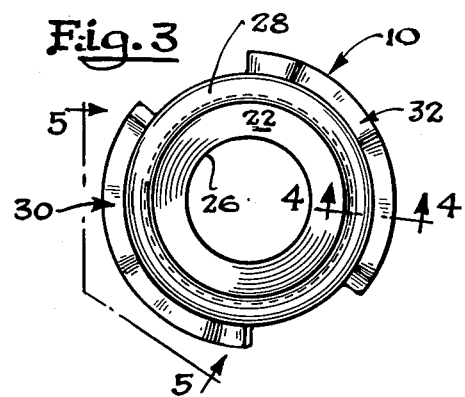
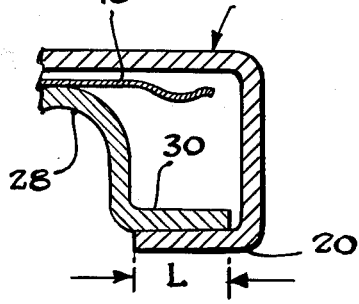
Inventor
Arthur C. Peters
By John Todd
Attorney United States Patent Office 3,211,320
Patented Oct. 12, 1965

3,211,320
FILLER NECK AND CLOSURE
Arthur C. Peters, Midlothian, Ill., assignor to United-Carr Incorporated, a corporation of Delaware
Filed Oct. 30, 1963, Ser. No. 320,217
4 Claims. (Cl. 220—40)

The present invention relates to radiators and more particularly it relates to an improved filler cap for radiators.

The present popularity of the so-called compact automobiles has led to a search for ways generally to reduce costs of manufacturing components for automobiles thereby to permit cost reductions of the assembled units and to adapt lighter metals for components of such automobiles.

Aluminum is an attractive metal to the manufacturer or fabricator because of its lightness and of the economics in using the metal in terms of initial cost, workability of the metal and durability of products manufactured with aluminum during use of the component in service. Aluminum is especially attractive for use in service conditions wherein the dissipation of heat is a primary requisite of the component. Automobile engines, generally, are fluid cooled. The fluid for cooling the engine block is circulated through a heat exchanger generally positioned in the forwardmost location of the automobile. The fluid is passed through conduits in the heat exchanger and the body of air striking the conduits cools the fluid for reintroduction to the engine block. The fluid then transfers heat from the engine block to the cooled fluid.

Generally automobile radiators have been made of copper or copper alloys due to the fact that copper has a relatively high heat transfer rate thereby permitting efficient cooling of the body of fluid in the fluid cooled engine system.

Aluminum can be attractive on an economic basis in competition with copper when all factors of acquisition and fabrication are considered. To this extent manufacturers, in the quest for materials that permit reduction in the gross weight of autos without concomitant reduction in the efficiency or durability of the car, seek to adapt the relatively light aluminum metal where feasible. One suggested use is to make radiators of aluminum including the internal tubing and the cooling fins.

The fluid cooling system of automobile engines is a pressurized system under system pressure of 13 to 15 p.s.i. during use. Steel closure caps are employed to provide access to and to close the system. In present radiator assemblies a brass filler cap is employed, which filler cap receives the steel closure cover member. The filler cap is affixed to the body of the radiator by brazing, welding or other suitable means.

With radiators of aluminum composition it was discovered that an undesirable galvanic action between the brass filler cap and aluminum body was precipitated. The galvanic action between the metals caused leakage channels to occur in the interfacial area defined therebetween rendering the radiator unacceptable for use. To compensate for this shortcoming an aluminum filler cap was affixed to the aluminum radiator body to receive the steel closure cap. This solved the galvanic corrosion problem. However, it was discovered that the aluminum filler cap was not sufficiently durable to permit sustained use. Repeated insertion and withdrawal of the closure cap from the filler cap caused abrasive destruction of the cam track defined on the filler cap with the result that the cam, after only limited periods of use, would not draw the closure cap into full sealing relation over the radiator opening, again rendering the system of little use.

Attempts were made to provide a steel or other hard metal cam surface to the aluminum filler cap but the problem of galvanic action between the dissimilar metals arose to introduce shortcomings in the system.

The present invention is directed to the provision of an improved filler cap construction that permits the use of an all aluminum cap body and that provides a camming track what will permit sustained use of the desired steel closure cap without deterioration of the cam surface. The improved filler cap involves the provision of a radially extending, all aluminum, cam surface. This improved cap takes advantage of the mill conditioned surface of the material and to that extent is relatively more abrasion resistant than a sheared surface characteristic of the earlier constructions. The mill rolled surface is relatively harder than the internal area of the aluminum sheet from which the filler caps are fabricated and to that extent the present filler cap takes advantage of the more desirable materials characteristics in the provision of a suitable camming surface on the cap itself.

It, accordingly, is a general object of the present invention to provide an improved filler cap construction.

A further object of the present invention resides in the provision of an improved filler cap of all aluminum construction.

Another object of the present invention resides in the provision of an improved aluminum cap for an aluminum radiator having an improved cam surface construction.

Still another object of the present invention resides in the provision of an improved aluminum filler cap having a radially extending camming surface for the reception of the cam follower elements of a steel closure cap wherein the camming surface includes the relatively hard, mill conditioned material surface.

The novel features which are believed to be characteristic of the invention are set forth with particularity in the appended claims. The invention itself, however, together with further objects and advantages thereof, will best be understood by reference to the following description taken in connection with the accompanying drawings, in which:

FIGURE 1 is a perspective view of a radiator body showing the filler cap and closure cap in relation thereto;

FIGURE 2 is a perspective view of the filler cap of the present invention;

FIGURE 3 is a top plan view of the filler cap of FIGURE 2;

FIGURE 4 is a fragmentary sectional view of a portion of the cam surface of the filler cap taken along lines 4—4 of FIGURE 3;

FIGURE 5 is a view of the cam surface of the filler cap of the present invention generated along area 5—5 of FIGURE 3; and FIGURE 6 is a fragmentary sectional view of the filler cap and closure cap in assembled relation.

Referring now more particularly to FIGURE 1 of the drawings the filler cap 10 of the present invention is shown mounted in the top opening of a radiator body 12. It should be observed that the radiator 12 is of the fluid heat exchange type wherein a plurality of longitudinally extending fluid conduits (not shown) are mounted within the radiator body and cooling fins 14 are affixed to said tubes to provide for transfer of coolant air over the tubes and to provide an increased surface area to transmit the heat from the fluid in the tubes to the coolant air, or the like. A closure cap 16 is provided to be sealingly received on the filler cap 10 of the system to provide means to close the coolant system against leakage under pressure and also to provide access to the system to add make-up fluids, if required.

The closure cap 16 is provided with a suitable pressure relief assembly 18 to provide means for relief of a temporary high pressure condition which may exist in the system from time to time. This means avoids pressure build up in the system and also obviates the need for removal of the pressure closure cap to relieve such transient high pressure conditions.

The cap 16 is provided also with cam means in the form of depending folded ear portions 20 to permit tight closure of the sealing means of the cap 16 against the mating sealing means of the filler cap 10. The cap 16 generally is made of steel or an iron alloy since it must be a durable member to withstand repeated opening and closing movements, must have sufficient strength to withstand abuse from dropping upon floors, other portions of the engine, or the like, when removed from the filler cap and also must have sufficient strength to withstand the thermal and pressure conditions in the system during use.

As indicated in FIGURE 2 of the drawings the filler cap 10 includes a bottom wall 22 and a side wall 24, said side wall and bottom wall being integrally joined and formed from a single stamping, or the like. The bottom wall 22 defines an opening 26 therein said opening providing access from the filler cap to the radiator fluid conduit system. The upper free edge of the side wall 24 spaced from the bottom wall is bent outwardly and downwardly forming a flange portion 28 laterally spaced from the side wall 24. The end or terminal portion of the flange 28 is folded radially outward to define the cam surfaces 30 and 32 along a portion of the periphery of the flange 28 of said filler cap. The non-cam defining areas along the periphery of the flange 28 provide means for insertion of the camming ears 20 of the closure cap 16.

As seen in FIGURES 3, 4, and 6 of the drawings, the cam flanges 30 and 32 extend radially outwardly to define a surface L of greater lateral dimension than the cross sectional thickness of the material. The relatively large cam surface L of the filler cap provides more efficient loading characteristics when engaged by the ears 20 of the closure cap 16. The load is distributed over a larger area thereby avoiding high localized loading and stresses concomitant with such loading. Preferably the ratio of L to wall thickness is about 4 to 1 although other ratios may effectively be employed.

An additional beneficial aspect of construction of the filler cap in the above noted manner resides in the fact that the mill conditioned surface is available as the cam surface. It was surprisingly noted that this mill conditioned surface was effective to resist rapid wear of the camming surface whereas the material on the sheared cam surface characteristic of filler caps manufactured in the conventional manner would flow on engagement with the steel ears 20 of the closure cap 16 during opening and closing action. Flow of material generally occurs from areas of high dynamic stress concentration to areas of lower stress concentration. It can readily be seen that such flow destroys the characteristic camming action of the cam surface and alters it to some form other than that originally intended. The full sealing action required to seat the closure cap against the filler cap may be altered and even destroyed thereby rendering the assembly ineffective in use. The present filler cap construction with the non-sheared radially extending camming surface is not subject to flow during engagement by the cam follower ears 20 of the closure cap 16. The mill conditioned surface is presented as the camming surface and this conditioned surface surprisingly is sufficiently hard to cam the closure cap to fully sealing closed position against the mating surface of the filler cap without resultant flow of any portion of the cam surface.

As seen more clearly in FIGURE 5 of the drawings, the cam surface includes a first safety catch depression 36, a pressure relief holding area 38 and a sealing cam surface 40. In use, the mating ear 20 of the closure cap 16 is inserted into the open area about the periphery of the flange 28. The closure cap 16 then is physically depressed toward the filler cap to permit the ear 20 to move below the depression 36 at which time the cap is rotated slightly to move the ear 20 over the depression 36 and into the holding area 38 of the cam surface. In this position the closure cap 16 is locked to the filler cap but is not fully seated in fluid sealing relation thereagainst. The cap 16 then is again moved against the filler cap and rotated with the ears 20 moving along the inclined cam surface 40. The ears 20 are pulled progressively downward axially of the filler cap 10 until they abut against the stop 42 in which position the sealing elements of the closure cap are in fluid sealing engagement with the mating sealing portions of the filler cap 10 to define a fluid sealed cooling system. Release of the closure cap is realized by rotating said cap in a counter motion to move the ears back along the inclined cam area 40 to bring them into the holding area 38. At this point, if the system is still at a pressure level above ambient pressure conditions the system pressure will be relieved through the overflow pipe 44 (FIGURE 2) to a position remote from the individual removing the cap to avoid possible burn injuries. When the pressure level in the system is balanced with that of the surrounding atmosphere the closure cap is removed fully from engagement with the filler cap and the system opened for free access.

In all of the above noted operating action the relatively smooth, hard mill conditioned surface of the steel closure cap is operating in bearing and camming relation on the relatively smooth, hard mill conditioned cam surface of the filler cap to permit optimum operation. As indicated in FIGURE 6 of the drawings the lateral dimension L defines the area of engagement of each ear with the mating camming surface so that the camming load is distributed over a relatively wide area. Distribution of the camming load over the wide cam surface area also permits redistribution of said load over a wide area of the flange member 28. It should be observed that a portion of the load placed upon the radially extending camming flange extends along the flange itself in that the closure cap ears 20 will attempt to deflect the camming flange upwardly. The flange (30 or 32) in resisting this action will distribute this portion of the load therealong to points spaced from the interface between the ear 20 and cam flange (30 or 32). This load, in turn, will be vertically resisted at adjacent points along the flange 28 of the filler cap. The remainder of the load, of course, acts directly upward against the flange 28 of the cap 10. Thus, distribution of a portion of the total closing load along the flange reduces the load on the flange 28 in the immediate interfacial area above the ear 20 of the closure cap 16. This reduces the probability of the flange 28 unfolding upon itself to move the cam surface 30 or 32 out of its original position and into a different camming position altering the camming characteristics and thereby the closure characteristics of the cam surface.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What I claim as new and desire to secure by Letters Patent of the United States is:

1. An improved one-piece filler cap for association with a radiator to receive a radiator closure cap in detachable relationship therewith, said closure cap including a circumferential side wall and a pair of opposed, inwardly turned camming legs secured to the bottom edge of the circumferential side wall, said filler cap comprising a cup-shaped body member having a joined bottom and side wall, the upper free end of said side wall spaced from said bottom wall being reversely bent outwardly and downwardly forming a flange portion laterally spaced outwardly from said side wall, the terminal end of said flange portion being bent radially outwardly forming a cam surface of a lateral width greater than the cross-sectional wall thickness of the side wall of the closure cap, said cam surface forming a cam bearing and guide surface to provide close tolerance camming means with a smooth finished bearing surface having skin hardness of greater magnitude than the internal material hardness, said cam surface being removed at two diametrically opposed points providing access means therein for receiving the camming legs of said closure cap.

2. A filler cap construction in accordance with claim 1 wherein the lateral width of the cam surface with respect to the cross-sectional wall thickness of the closure cap is approximately four to one.

3. A filler cap construction in accordance with claim 1 wherein the terminal end of the flange portion bent radially outwardly is provided with stop means.

4. A filler cap construction in accordance with claim 1 wherein each of the cam surfaces includes a catch depression, a pressure holding area, and a sealing surface to stepwise engage the camming legs of the closure cap.

References Cited by the Examiner
UNITED STATES PATENTS

| | | | |
|---|---|---|---|
| 3,062,400 | 11/62 | Humbert | 220—44 |
| 3,070,255 | 12/62 | Krake | 220—40 |

THERON E. CONDON, *Primary Examiner.*

GEORGE O. RALSTON, *Examiner.*